US012602884B2

(12) United States Patent
Yan

(10) Patent No.: US 12,602,884 B2
(45) Date of Patent: Apr. 14, 2026

(54) DISPLAY SYSTEM AND DISPLAY METHOD FOR AUGMENTED REALITY

(71) Applicant: Shenzhen Fulian Fugui Precision Industry Co., Ltd., Shenzhen (CN)

(72) Inventor: Yu-Hu Yan, New Taipei (TW)

(73) Assignee: Shenzhen Fulian Fugui Precision Industry Co., Ltd., Shenzhen (CN)

( * ) Notice: Subject to any disclaimer, the term of this patent is extended or adjusted under 35 U.S.C. 154(b) by 142 days.

(21) Appl. No.: 18/600,983

(22) Filed: Mar. 11, 2024

(65) Prior Publication Data

US 2025/0285383 A1     Sep. 11, 2025

(51) Int. Cl.
*G06T 19/00*       (2011.01)
*H04N 23/56*       (2023.01)

(52) U.S. Cl.
CPC ........... *G06T 19/006* (2013.01); *H04N 23/56* (2023.01)

(58) Field of Classification Search
CPC .............................. G06T 19/006; H04N 23/56
See application file for complete search history.

(56) References Cited

U.S. PATENT DOCUMENTS

| | | | | |
|---|---|---|---|---|
| 6,191,809 B1 * | 2/2001 | Hori | ..................... | H04N 13/122 |
| | | | | 348/E13.016 |
| 8,717,392 B2 * | 5/2014 | Levola | .................. | G06F 3/1431 |
| | | | | 345/677 |
| 8,836,720 B2 * | 9/2014 | Oyama | .................. | G02B 27/01 |
| | | | | 345/629 |
| 2021/0033710 A1 * | 2/2021 | Matsumoto | ............ | H04N 23/55 |
| 2021/0103143 A1 * | 4/2021 | Chang | ..................... | G06F 3/011 |
| 2021/0318541 A1 | 10/2021 | Huang et al. | | |

FOREIGN PATENT DOCUMENTS

| | | |
|---|---|---|
| CN | 111035458 A | 4/2020 |
| CN | 114627270 A | 2/2023 |
| CN | 116723303 A | 9/2023 |
| CN | 116866541 A | 10/2023 |
| TW | 201942712 A | 11/2019 |

* cited by examiner

*Primary Examiner* — Motilewa Good-Johnson
(74) *Attorney, Agent, or Firm* — ScienBiziP, P.C.

(57)          ABSTRACT

A Display System and Display Method for Augmented Reality, comprising a display device displays a light-emitting mark, and an augmented reality wearable device comprising a wearable body equipped with a light sensor. The light sensor detects the light-emitting mark and a flashing signal, then passes both the light-emitting mark and the flashing signal to a processor. The processor compares the flashing signal and a reference flashing signal, and when they match and the light-emitting mark matches a reference light image, it controls an image capturing device on the wearable body to capture a light-emitting mark image. The processor calculates a distance information and an angular information between the image capturing device and the light-emitting mark based on the light-emitting mark image, generating a projection parameters accordingly. The processor controls the projection device to adjust a projection image of an object according to the projection parameters.

16 Claims, 5 Drawing Sheets

DISPLAY SYSTEM AND DISPLAY METHOD FOR AUGMENTED REALITY

FIELD

The subject matter herein generally relates to an augmented reality projection technology, particularly an augmented reality display system and display method with energy-efficient.

BACKGROUND

In augmented reality spatial computation, feature points in real space are often chosen as markers or anchors. Feature points provide the augmented reality system with a basis for identifying real space, allowing the augmented reality system to generate virtual objects(image) of corresponding sizes and project the generated virtual objects(image) onto the space corresponding to the feature points.

Currently, in obtaining the relationship with real space, the augmented reality system typically involves turning on the camera to capture environmental images of the real space. Through analyzing the captured environmental images, information about the real space is determined for projecting virtual objects(image). Available techniques for determining spatial information in reality include Marker Tracking, Structure from Motion (SFM), and Simultaneous Localization and Mapping (SLAM). However, these techniques require the camera to be continuously turned on for capturing environmental images of real space and then constantly analyzing these images. This process not only consumes power but also involves complex and time-consuming computations.

Therefore, a technology that performs spatial computation on demand, and employs simpler algorithms may effectively save energy and reduce computation time.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
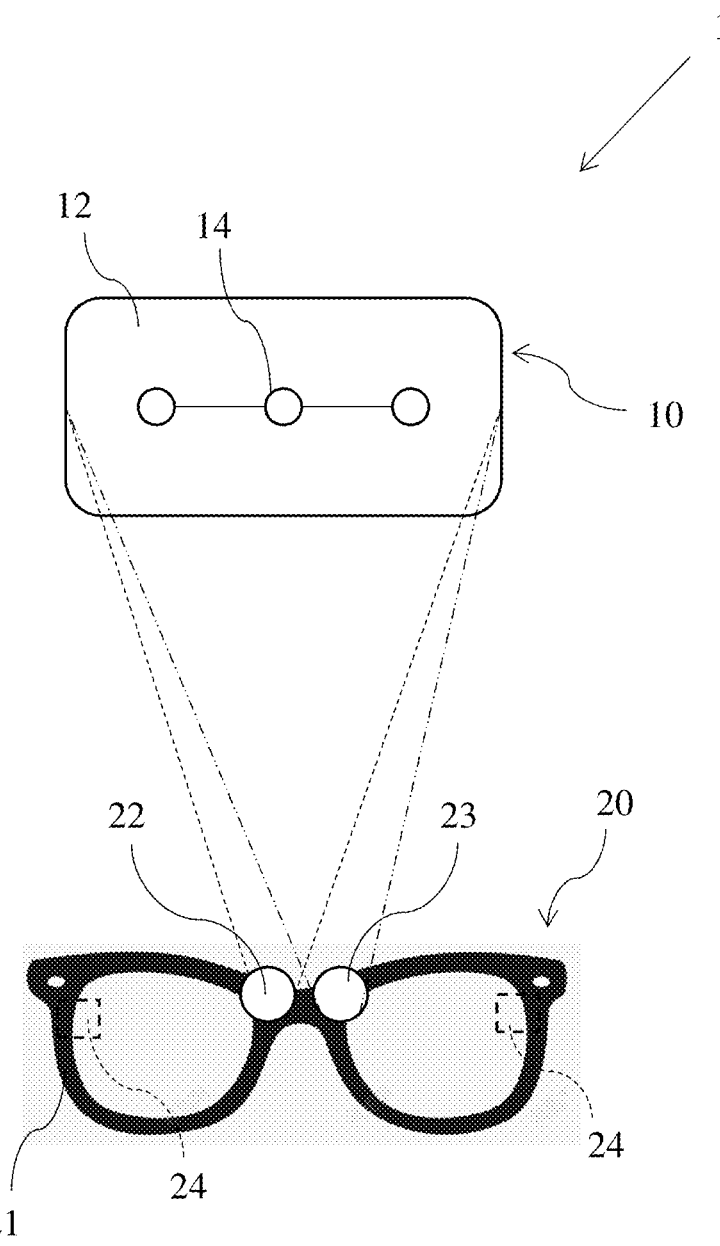
FIG. 1 is a system schematic diagram of an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to;" it specifically indicates open-ended inclusion or membership in the so-described combination, group, series, and the like.

The present invention provides a display system and display method for augmented reality. The system automatically activates the image capturing device when it needs to capture real environmental images to determine the real environmental space. This helps to avoid prolonged activation of the image capturing device, thereby effectively saving energy. Additionally, the present invention utilizes special algorithms to reduce computational complexity, which not only decreases computation time but also reduces power consumption.

Figure 2:
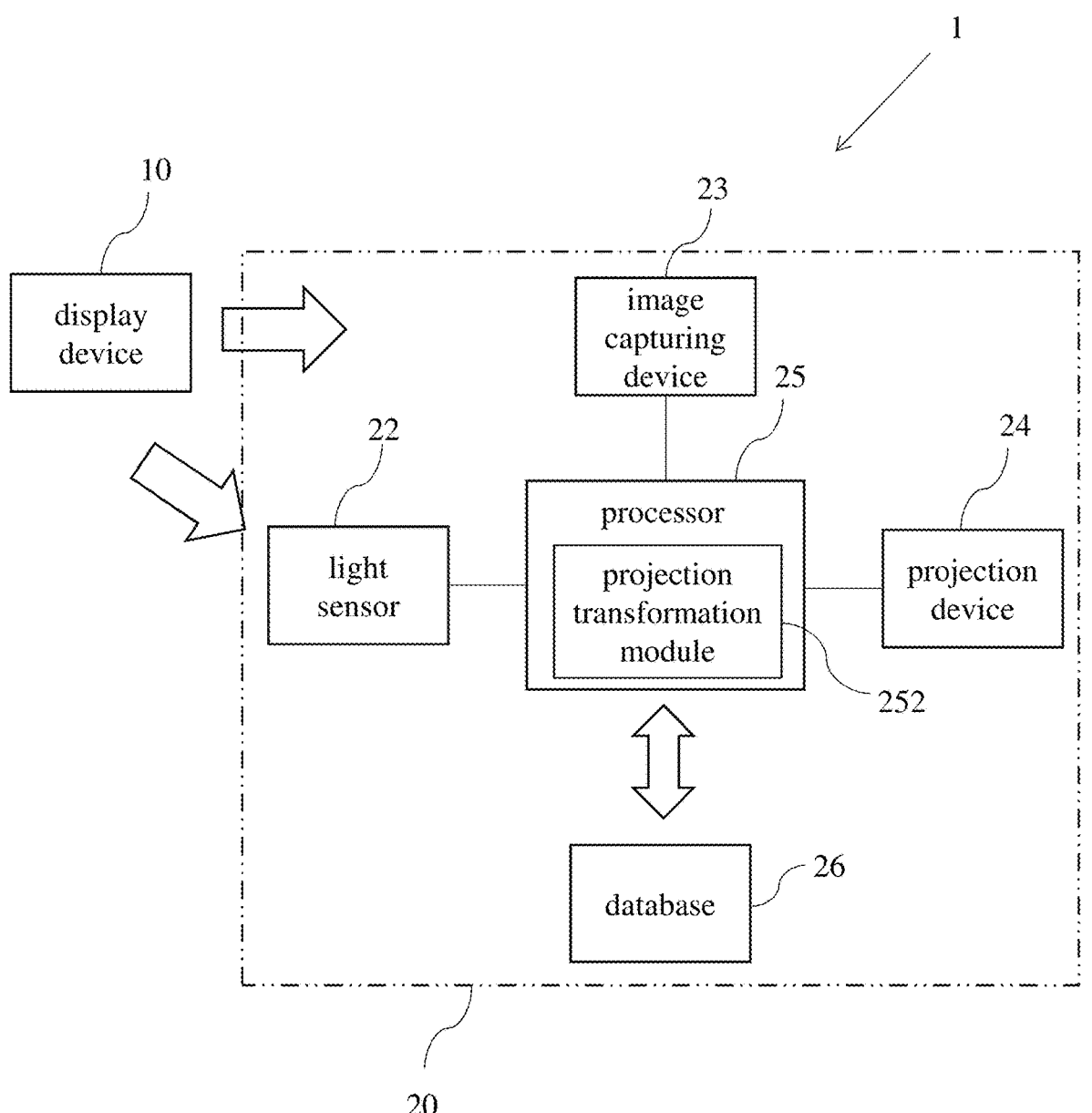
FIG. 2 is a system block diagram of the embodiment of the present disclosure.

Please refer to FIG. 1 and FIG. 2 to illustrate the structure of a display system for augmented reality 1 according to the present invention. The display system for augmented reality 1 comprises a display device 10 for a light-emitting mark and an augmented reality wearable device 20. The display device 10 is used to provide a display of a light-emitting mark. The display device 10 can be a display screen or a light-emitting board capable of emitting light or displaying illuminated graphics. In this embodiment, the display device 10 comprises a substrate 12 and a light-emitting device 14, where the light-emitting device 14 is positioned on the substrate 12. The substrate 12 can be a circuit board used to control the light-emitting device 14 to generate the light-emitting mark. Additionally, the substrate 12 can control the flashing of light and generate a flashing signal for the light-emitting mark according to specific blinking sequences. For example, it can generate various combinations of continuous light blinking, such as blink-blink-off-off-blink, to produce the flashing signals, but this is not limited to the embodiment described above.

The light-emitting device 14 can be a lamp or composed of multiple light-emitting diodes (LEDs). In this embodiment, the light-emitting device 14 consists of multiple LEDs arranged in a straight line to generate a pattern of straight-line light-emitting mark. In preferred embodiments, the multiple LEDs can be multiple infrared LEDs to present an infrared light-emitting mark. The substrate 12 can control the light emission of the light-emitting device 14 to generate the light-emitting mark, and it can also control the frequency of light emission to make the light flash and produce the flashing signals. In this embodiment, the flashing signals can be continuous signals of flashing light.

The augmented reality wearable device 20 comprises a wearable body 21, a light sensor 22, an image capturing device 23, a projection device 24, a processor 25, and a database 26. The light sensor 22, image capturing device 23, and projection device 24 are positioned on the wearable body 21. The processor 25 is coupled to the light sensor 22, image capturing device 23, projection device 24, and database 26. In this embodiment, the processor 25 is positioned on the wearable body 21, but it can also be positioned on the cloud to control the light sensor 22, image capturing device 23, and projection device 24 through wireless communication signals such as wireless networks, Bluetooth, radio, etc. In this embodiment, the database 26 is a storage device set up on the cloud, such as a hard drive. The database 26 can also be positioned on the wearable body 21 without being limited to being set up on the cloud.

In this embodiment, the wearable body 21 can be a typical wearable eyeglass frame used in augmented reality, including semi-transparent lenses that align in front of the wearer's eyes when worn. When the projection device 24 projects virtual objects(image) onto the semi-transparent lenses, the user can see the overlay of the real environment and virtual objects(image). Since augmented reality technology is well-known, further elaboration is not necessary.

The light sensor 22 can be an infrared sensor. It can detect the optical markings generated by the display device 10 as well as the flashing signals. The image capturing device 23 can be a camera or a camcorder used to capture environmental images. The projection device 24 can be a projector or a display screen capable of generating images, and it can project virtual objects(image). When the projection device 24 projects onto the semi-transparent lenses of the wearable body, the user can see the overlay of the real environment and virtual images. Since augmented reality technology is well-known, further elaboration is not necessary.

The database 26 can be a hard disk or memory, serving as a data storage device. The database 26 contains a reference flashing signal, a reference light-emitting mark image, focal length information, actual light-emitting mark size information, a real-space distance algorithm, and an angular rotation algorithm. The database 26 can provide the stored information to the processor 25, enabling the processor 25 to perform computations based on this information. The reference flashing signal is a continuous signal of flashing light. For example, the reference flashing signal can be set as blink-blink-off-off-blink, but this is not limited to this sequence. The reference light-emitting mark image is an optical image of a specific pattern. For example, the reference light-emitting mark image can be a pattern of straight lines, but this is not limited to this pattern. The focal length information refers to the focal length of the image capturing device 23. The actual light-emitting mark size information is the size of the light-emitting mark in real space, measured in centimeters (cm) or millimeters (mm). The real-space distance algorithm is as follows:

$$D = (T \times t)/d;$$

the D represents the distance information, the T represents the actual light-emitting mark size information, the t represents the virtual light-emitting mark size information, the d represents the focal length information. The angle rotation algorithm is as follows:

$$\theta = \tan^{-1}\left(\frac{O}{A}\right);$$

the O represents the opposite pixels, the A represents the adjacent pixels, the θ represents the angle information.

The processor 25 can be a Central Processing Unit (CPU). The processor 25 is coupled to the light sensor 22, image capturing device 23, and projection device 24. The processor 25 can receive the flashing signals and the light-emitting mark transmitted by the light sensor 22. The processor 25 can retrieve the reference flashing signal from the database 26, when the processor 25 receives the flashing signals transmitted by the light sensor 22. The processor 25 compares the light-emitting mark flashing signals with the reference flashing signal. The processor 25 retrieves the reference light-emitting mark image from the database 26, when the flashing signal matches the reference flashing signal. The processor 25 compares the light-emitting mark with the reference light-emitting mark image. The processor 25 controls the image capturing device 23 to activate and capture a light-emitting mark image, when the light-emitting mark matches the reference light-emitting mark image.

The processor 25 calculates the distance information and the angular information between image capturing device 23 and the light-emitting mark based on the light-emitting mark image. The Database 26 can provide the focal length information, actual light-emitting mark size information, real-space distance algorithm, and angular rotation algorithm to processor 25. The processor 25 to perform calculations for the distance information and the angular information based on this information. After calculating the distance information and angular information, the processor 25 generates a projection parameters based on these calculations. Then, the processor 25 controls projection device 24 to adjust a projection image of an object according to the projection parameters.

In this embodiment, the processor 25 includes a projection transformation module 252 capable of generating the projection parameters. The projection parameters include size parameters and angle parameters. The projection parameters are calculated by the transformation module 252 based on the numerical value of the distance information to generate corresponding a size parameters, and an angle parameters are generated correspondingly based on the angular information.

Figure 3:
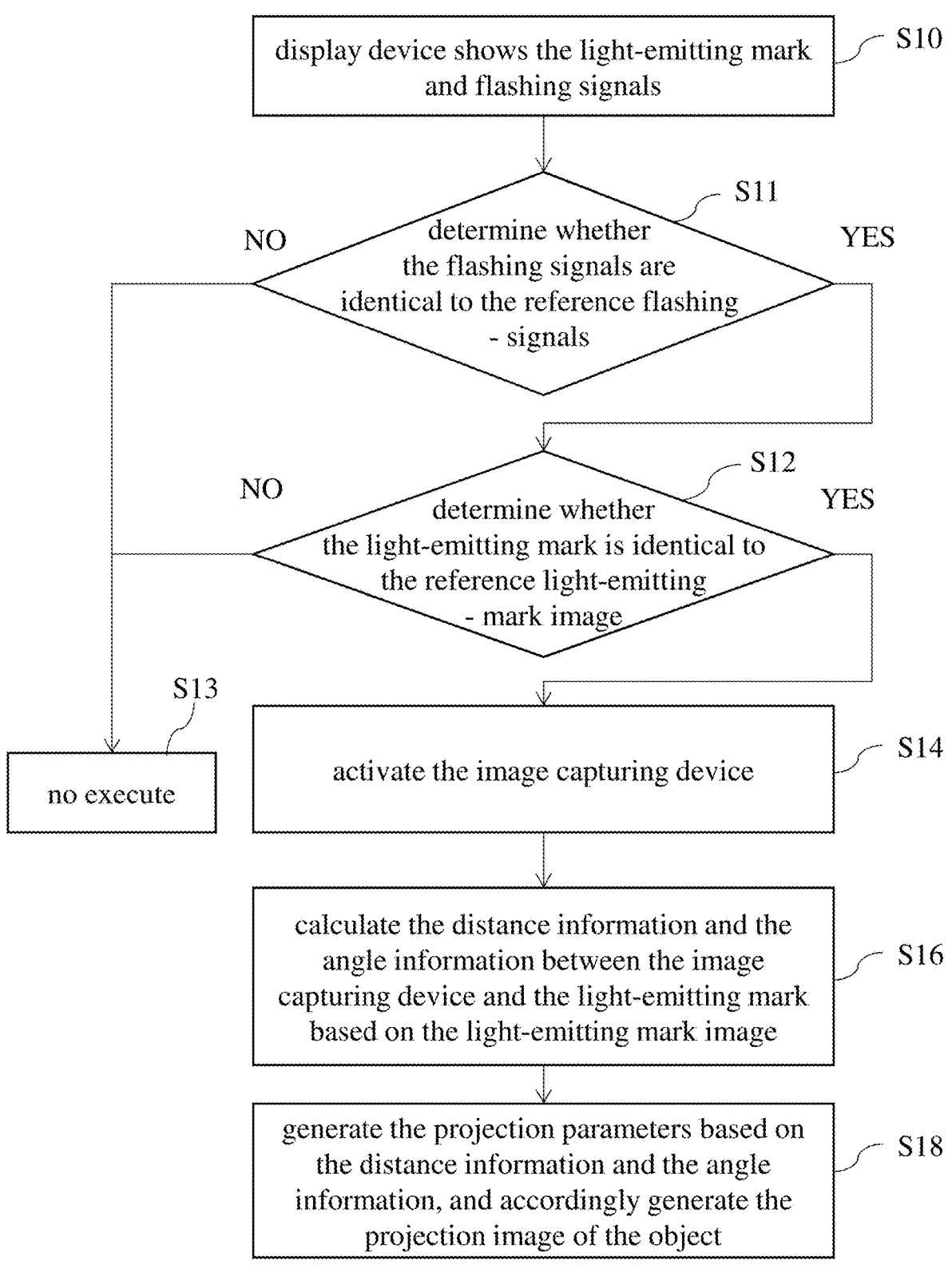
FIG. 3 is a method flowchart of implementing the embodiment of the present disclosure.

After explaining the system architecture of the present invention, please refer to FIG. 3 to illustrate the operational flow of the method for displaying augmented reality. First, proceed to step S10, The display device 10 displays the light-emitting mark and flashing signals.

Referring to step S11, the processor 25 determines whether the flashing signals match the reference flashing signals. When the light sensor 22 detects the light-emitting mark and the flashing signals, it transmits them to processor 25. The processor 25 retrieves the reference flashing signals from database 26 when it receives the light-emitting mark and flashing signals. The processor 25 determines whether the flashing signals match the reference flashing signals, if YES, the flashing signals match the reference flashing signals, proceed to step S12. For example, if the flashing signals are blink-blink-off-off-blink, and the reference flashing signals are also blink-blink-off-off-blink, then they are considered identical, and proceed to step S12. If NO, the processor 25 determines that the flashing signals do not match the reference flashing signals, proceed to step S13 without executing any action.

Please refer to step S12, the processor 25 retrieves the reference light-emitting mark image from database 26. The processor 25 determines whether the light-emitting mark matches the reference optical image. For example, the reference light-emitting mark image could be a rectangular pattern with a fixed aspect ratio, such as a straight-line optical pattern. When the light-emitting mark is also a rectangular pattern with the same aspect ratio, such as a straight-line light-emitting mark pattern, it is considered identical. If NO, the processor 25 determines that the light-emitting mark does not match the reference light-emitting mark image, proceed to step S13 without executing any action. If YES, the processor 25 determines that the light-emitting mark matches the reference light-emitting mark image, proceed to step S14. The processor 25 controls the image capturing device 23 to activate and capture the light-emitting mark image.

In this embodiment, the image capturing device 23 will only be automatically activated to capture images of the surrounding real environment when the flashing pattern detected by the light sensor 22 matches the reference flashing pattern and when the light-emitting mark matches the reference optical image. This approach effectively resolves the issue of excessive power consumption associated with the need to keep the camera continuously active to capture the environment.

Proceeding to step S16, the image capturing device 23 provides the light-emitting mark image to processor 25. The processor 25 calculates the distance information and the angular information between the image capturing device 23 and the light-emitting mark based on the light-emitting mark image.

Figure 4:
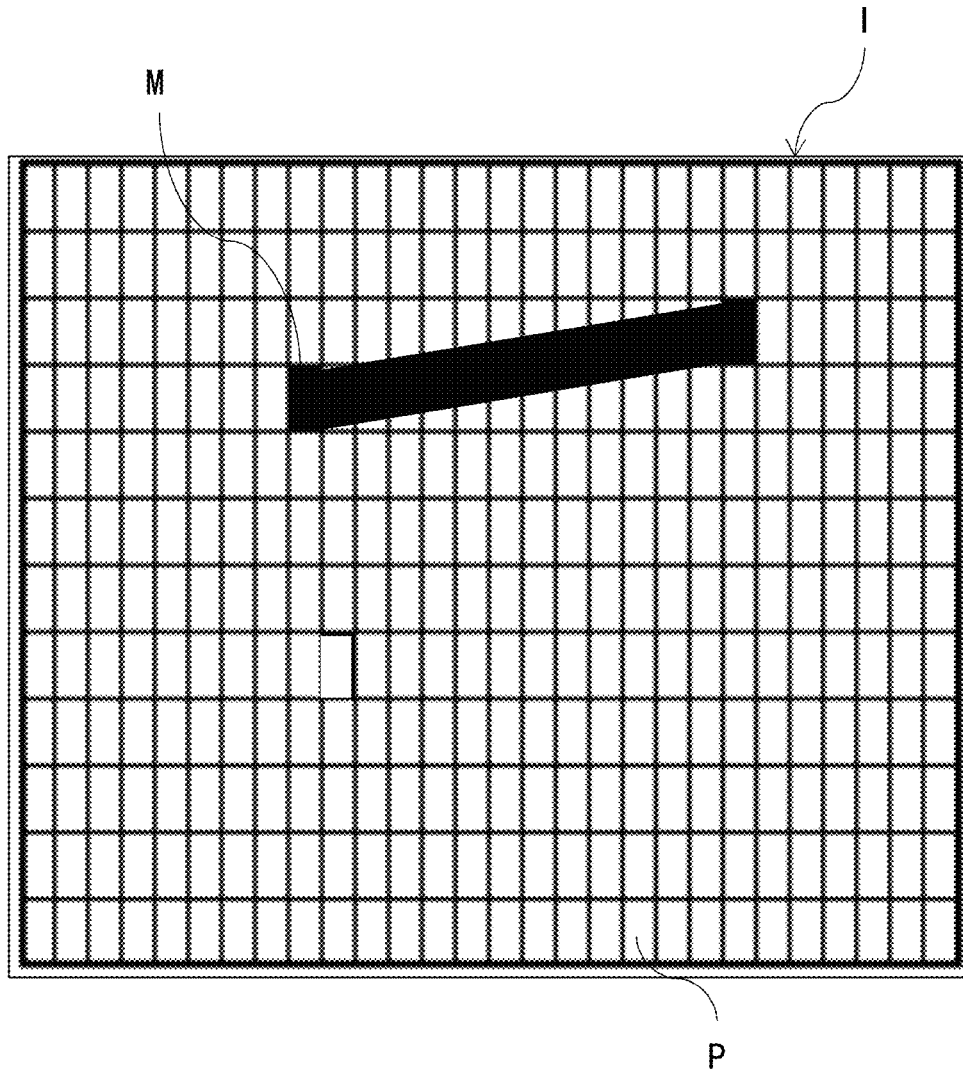
FIG. 4 is a schematic diagram illustrating a calculation of distance information using light-emitting mark image of the embodiment of the present disclosure.

Please refer to FIG. 4 for the process of calculating the distance information. As shown in FIG. 4, the light-emitting mark image I is composed of multiple pixels P, and within the light-emitting mark image I includes a virtual marker M. The processor 25 generates a virtual light-emitting mark size information based on the number of pixels occupied by the virtual marker M in the light-emitting mark image I. In this embodiment, the virtual marker M occupies 14 pixels P, thus obtaining the virtual light-emitting mark size information as 14 pixels P. The processor 25 retrieves focal length information, actual light-emitting mark size information, and the real-space distance algorithm from database 26. The processor 25 incorporates the focal length information, actual light-emitting mark size information, and virtual light-emitting mark size information into the real-space distance algorithm to calculate the distance information. The real-space distance algorithm is as follows:

$$D = (T \times t)/d;$$

the D represents the distance information, the T represents the actual light-emitting mark size information, the t represents the virtual light-emitting mark size information, the d represents the focal length information.

Figure 5:
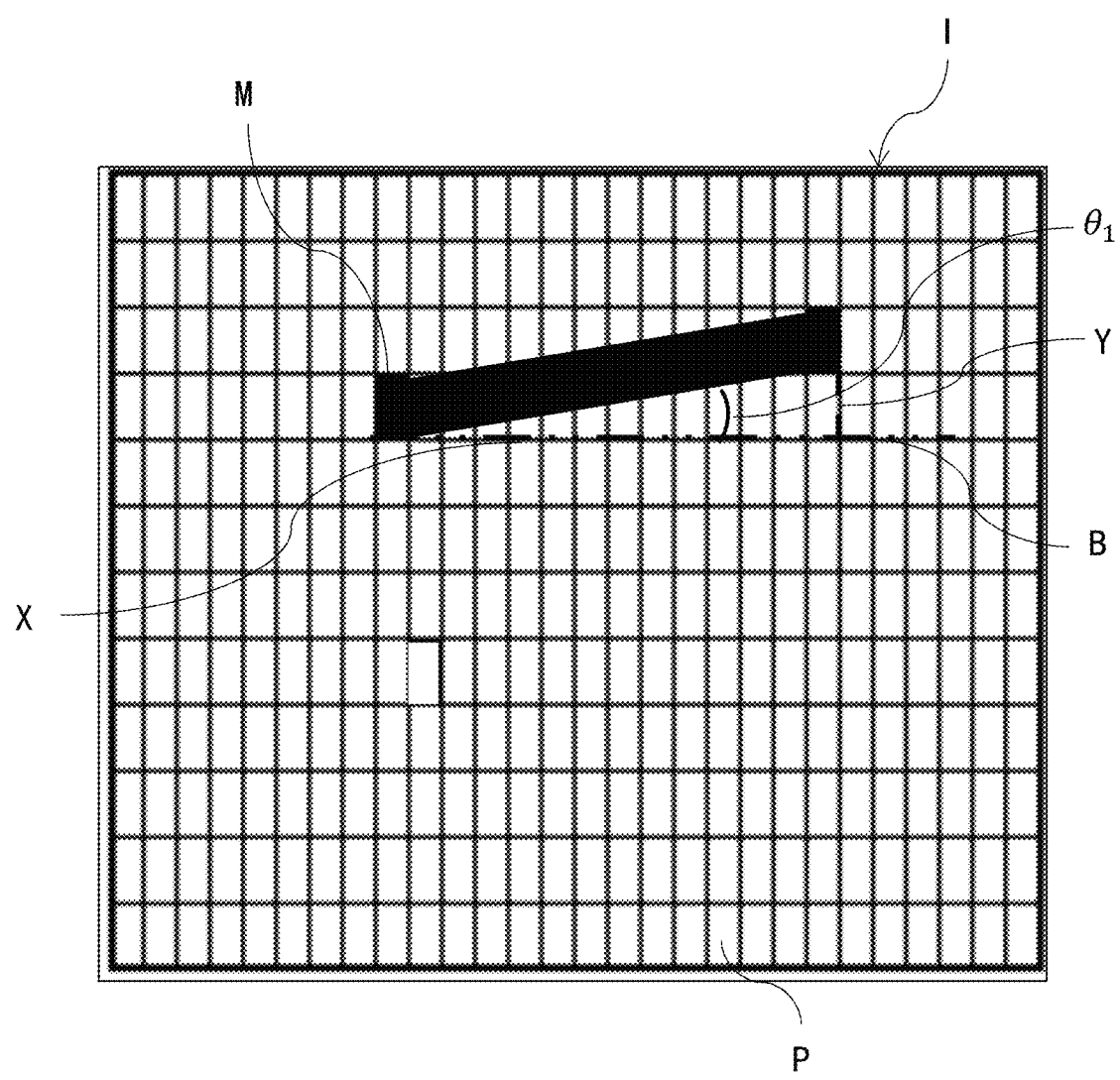
FIG. 5 is a schematic diagram illustrating a calculation of angular information using light-emitting mark image of the embodiment of the present disclosure.

Please refer to FIG. 5 for the explanation of calculating the angular information. The processor 25 generates a baseline B along the parallel image coordinate X-axis in the light-emitting mark image I, intersecting with the virtual marker M. The processor 25 generates a virtual angle $\theta_1$ at the intersection. The processor 25 obtains an adjacent pixels and a opposite pixels for the virtual angle $\theta_1$. The adjacent pixels refers to the pixel quantity along the adjacent side X, while the opposite pixels refers to the pixel quantity along the opposite side Y. In this embodiment, the adjacent side X occupies 14 pixels, and the opposite side Y occupies 2 pixels. The processor 25 retrieves the angle rotation algorithm from database 26. Then, it incorporates the adjacent pixels and the opposite pixels into the angular rotation algorithm to calculate the angular information. The angle rotation algorithm is as follows:

$$\theta = \tan^{-1}\left(\frac{O}{A}\right);$$

the O represents the opposite pixels, the A represents the adjacent pixels, the $\theta$ represents the angle information.

Next, proceed to step S18, where the projection parameters are generated based on the distance information and angular information. In this embodiment, the projection parameters are generated through the projection transformation module 252 in processor 25. The projection transformation module 252 includes a distance-size mapping table. The distance-size mapping table contains the size of the projection image of the object corresponding to each distance information, such as the length and width of the projection image of the object. For example, the projection image of the object could be a rectangular plane image, and its size includes the dimensions of the length and width of the projection image of the object. The unit for the projection image of the object size can be in millimeters (mm). Therefore, the projection transformation module 252 can calculate the corresponding the size parameters of the projection image of the object based on the numerical value of the distance information. The projection transformation module 252 also generates the angle parameters corresponding to the angular information. The processor 25 can adjust the size and angle of the projection image of the object based on the size parameters and the angle parameters, and then control the projection device 24 to adjust the projection image of the object according to the projection parameters.

The processor 25 can also utilize eye-tracking technology to determine the spatial relationship between the user's eyes and the wearable device, adjusting the projection image of the object accordingly. Since this technology is a common practice in adjusting projection image of the objects in typical virtual reality glasses, further elaboration is omitted.

In summary, the present invention automatically activates the image capturing device only upon detecting the light-emitting mark, which effectively saves energy. Additionally, the utilization of specialized algorithms reduces computational complexity, thereby decreasing processing time and energy consumption.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A display system for augmented reality comprising:

a display device configured for displaying a light-emitting mark, controlling flashing of the light-emitting mark to generate a flashing signal; and an augmented reality wearable device comprising:

a wearable body;

a light sensor on the wearable body, the light sensor detecting the light-emitting mark and the flashing signal;

an image capturing device on the wearable body;

a projection device on the wearable body, and configured for generating a projection image of an object;

a database storing a reference flashing signal and a reference light-emitting mark image; and a processor coupled to the light sensor, the image capturing device, the projection device, and the database, wherein:

when the processor receives the flashing signal transmitted by the light sensor, the processor retrieves the reference flashing signal from the database, and if the processor determines the flashing signal matches the reference flashing signal, the processor further retrieves the reference light-emitting mark image from the database, and if the processor determines the light-emitting mark matches the reference light-emitting mark image, the processor further controls the image capturing device to capture a light-emitting mark image, calculates a distance information and an angle information between the image capturing device and the light-emitting mark based on the light-emitting mark image, generates a projection parameters based on the distance information and the angle information, and controls the projection device to adjust the projection image of the object according to the projection parameters.

2. The display system for augmented reality of claim 1, wherein the display device comprising:

a substrate; and a light-emitting device positioned on the substrate and configured to generate the light-emitting mark and the flashing signal according to a control of the substrate.

3. The display system for augmented reality of claim 1, wherein the database further stores a focal length information of the image capturing device, an actual light-emitting mark size information of the light-emitting mark, a real-space distance algorithm, and an angle rotation algorithm.

4. The display system for augmented reality of claim 3, wherein the processor further calculates the distance information based on the number of pixels occupied by a virtual marker in the light-emitting mark image, generating a virtual light-emitting mark size information, then the processor retrieves the focal length information, the actual light-emitting mark size information, and real-space distance algorithm from the database, then the processor inputs the focal length information, actual light-emitting mark size information, and virtual light-emitting mark size information into the real-space distance algorithm to calculate the distance information.

5. The display system for augmented reality of claim 4, wherein the real-space distance algorithm is as follows:

$$D = (T \times t)/d,$$

wherein:

the D represents the distance information, the T represents the actual light-emitting mark size information, the t represents the virtual light-emitting mark size information, the d represents the focal length information.

6. The display system for augmented reality of claim 1, wherein the light-emitting mark is a rectangular light-emitting mark.

7. The display system for augmented reality of claim 3, wherein the processor further calculates the angle information by generating a baseline along the X-axis of parallel image coordinates in the light-emitting mark image, intersecting with the virtual marker, and producing a virtual angle at the intersection, then the processor obtains an adjacent pixels and a opposite pixels at the intersection; the processor retrieves the angle rotation algorithm from the database and inputs the adjacent pixels and the opposite pixels into the angle rotation algorithm to calculate the angle information.

8. The display system for augmented reality of claim 7, wherein the angle rotation algorithm is as follows:

$$\theta = \tan^{-1}\left(\frac{O}{A}\right),$$

wherein:

the O represents the opposite pixels, the A represents the adjacent pixels, the θ represents the angle information.

9. The display system for augmented reality of claim 1, the processor comprising a projection transformation module configured to generate the projection parameters comprising size parameters and angle parameters, the projection transformation module further configured to calculate the size parameters based on the distance information and generate the angle parameters based on the angle information.

10. The display system for augmented reality of claim 1, wherein the light-emitting mark is an infrared light-emitting mark; the light sensor is an infrared sensor.

11. A method for displaying augmented reality, comprising:

displaying a light-emitting mark and a flashing signal by a display device;

when a processor determines that a light sensor detects the light-emitting mark flashing signal identical to a reference flashing signal, proceed to the next step;

the processor determines that when the light sensor detects the light-emitting mark identical to a reference light image, activating an image capturing device to capture a light-emitting mark image;

the processor calculates a distance information and an angle information between the image capturing device and the light-emitting mark based on the light-emitting mark image; and the processor generates a projection parameters based on the distance information and the angle information, and generates a projection image of an object based on the projection parameters.

12. The method for displaying augmented reality of claim 11, wherein the steps for calculating the distance information comprising:

generating a virtual light-emitting mark size information based on the number of pixels occupied by a virtual marker in the light-emitting mark image;

obtaining a focal length information of the image capturing device, an actual light-emitting mark size information of the light-emitting mark, and a real-space distance algorithm; and inputting the focal length information, the actual light-emitting mark size information, and the virtual light-emitting mark size information into the real-space distance algorithm to calculate the distance information.

13. The method for displaying augmented reality of claim 12, wherein the real-space distance algorithm is as follows:

$$D = (T \times t)/d;$$

the D represents the distance information, the T represents the actual light-emitting mark size information, the t represents the virtual light-emitting mark size information, the d represents the focal length information.

14. The method for displaying augmented reality of claim 11, wherein the steps for calculating the angle information comprising:

generating a baseline along the X-axis of parallel image coordinates in the light-emitting mark image, intersecting with the virtual marker, and producing a virtual angle at the intersection;

the processor obtains an adjacent pixels and an opposite pixels at the intersection of the virtual angle; and the processor inputs the adjacent pixels and the opposite pixels into an angle rotation algorithm to calculate the angle information.

15. The method for displaying augmented reality of claim 14, wherein the angle rotation algorithm is as follows:

$$\theta = \tan^{-1}\left(\frac{O}{A}\right);$$

the O represents the opposite pixels, the A represents the adjacent pixels, the θ represents the angle information.

16. The method for displaying augmented reality of claim 11, wherein the projection parameters comprising size parameters and angle parameters, the processor calculates the size parameters based on the distance information and generates the angle parameters based on the angle information.

\* \* \* \* \*